Figure 1:
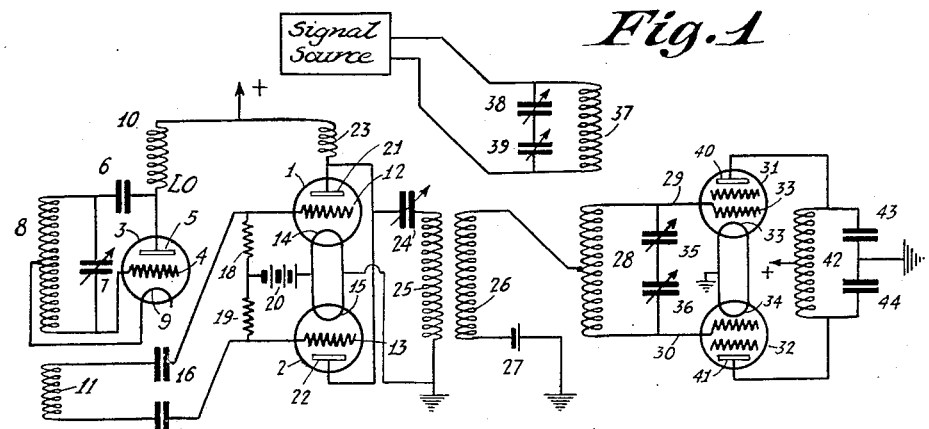
Figure 1A:
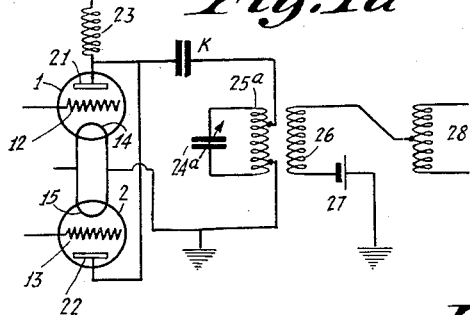
Figure 1B:
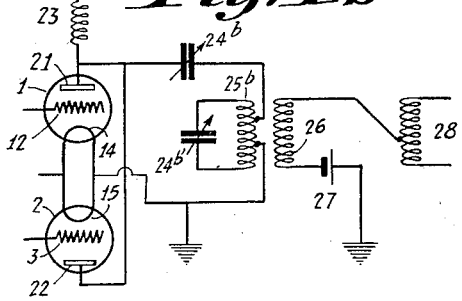

Feb. 13, 1934.  C. G. KEMP ET AL  1,946,746

SUPERHETERODYNE RADIORECEIVER

Filed Jan. 13, 1931

INVENTORS
COLIN G. KEMP
LESLIE G. KEMP

BY H. S. Grover

ATTORNEY

Patented Feb. 13, 1934

1,946,746

UNITED STATES PATENT OFFICE 1,946,746

SUPERHETERODYNE RADIORECEIVER

Colin Gordon Kemp and Leslie George Kemp, Southampton, England, assignors to Radio Corporation of America, a corporation of Delaware Application January 13, 1931, Serial No. 508,440, and in Great Britain January 25, 1930

8 Claims. (Cl. 250—20)

This invention relates to thermionic valve frequency amplifiers and has for its object to provide a frequency multiplier arrangement of very simple construction and adapted for use in a special superheterodyne receiver to be described later and also for use for multiplying the frequencies obtained from crystals, tuning forks, oscillating valves and other devices employed in connection with short wave transmitters, standard wave meters and similar arrangements wherein a constant high frequency oscillation is required to be obtained from a relatively low frequency source.

According to this invention a frequency multiplier comprises two detectors arranged in push pull with their anode circuits in parallel, means for applying the frequency to be multiplied between the grids of said thermionic detectors, a circuit tuned to twice the frequency of the input frequency and connected to the common anode connection of said detectors, and means for obtaining from said circuit output energy of twice the frequency of the input energy.

The circuit giving the double frequency output may take various forms. It may take the form of a series resonant circuit composed of inductance and capacity in series i. e. a so-called acceptor circuit; or it may take the form of an auto-coupled circuit in which the double frequency impulses from the two parallel anodes pass to earth through a portion of the inductance of a parallel resonant circuit composed of an inductance and a capacity in parallel; or a combination of these two forms may be employed, the arrangement being such that the primary of the auto-transformer constitutes an acceptor circuit for the double frequency while the secondary constitutes a parallel resonant circuit for the same frequency. Though not limited to its application thereto the invention is of particular use in connection with superheterodyne radio receivers and its adaptation to such receivers solves a difficulty commonly met with in such receivers as at present known when operating upon short waves.

It has been found that when superheterodyne receivers are operated upon short waves, adjustment of the input and/or of any intermediate short wave circuits which are practically in resonance with the local oscillator used for creating the beat frequency, result in a frequency variation in the oscillation locally generated. This phenomenon is generally known as "pulling".

The application of the present invention to short waves superheterodyne receivers avoids this difficulty of "pulling".

The novel features which we believe to be characteristic of our invention are set forth in particularity in the appended claims, the invention itself, however, as to both its organization and method of operation will best be understood by reference to the following description taken in connection with the drawing in which we have indicated diagrammatically several circuit organizations whereby our invention may be carried into effect.

One way of carrying out the invention as applied to a short wave superheterodyne receiver is illustrated diagrammatically in the accompanying Fig. 1. The accompanying Figures 1$^a$, 1$^b$ illustrate detail modifications of the arrangement shown in Fig. 1.

Referring to Fig. 1, 1$^a$ 1$^b$ and more particularly to Fig. 1 oscillations generated by a local oscillator generally designated LO are applied between the grids of a pair of thermionic detectors 1, 2 arranged in push pull. The local oscillation generator consists of a triode 3 whose grid 4 is connected to its anode 5 through a blocking condenser 6 and in series therewith a resonant circuit 7, 8, tuned to a frequency N (say). The mid-point of the inductance 8 of this tuned circuit is connected to the cathode 9 in the usual way and the anode 5 is connected to a source of anode potential (not shown) through a suitable choke 10.

The coil 8 is coupled to a secondary coil 11 which is effectively shunted across the grids 12, 13, of the detector valves 1, 2, whose cathodes 14, 15 are connected together, each grid being connected to its appropriate end of the secondary coil 11 through a fixed condenser 16 or 17. The two grids 12, 13 are connected together through a pair of similar leak resistances 18, 19 in series, the junction point of said leak resistances being connected through a bias battery 20 to the common cathode connection. The values of the leak resistances and the bias battery are such as to cause the two triodes which are thus in push-pull to act as detectors. The anodes 21, 22 of the detecting triodes 1, 2 are connected together and the junction point is connected through a choke 23 to the same source of anode potential as that which feeds the local oscillator valve. The common anode point is also connected to ground either through (1) an acceptor circuit consisting of a variable condenser 24 and an inductance 25 in series, said acceptor being tuned to a frequency 2N (see Fig. 1); or (2) a suitable blocking condenser K and a portion of the inductance of a parallel resonant circuit composed of an inductance $25^a$ and a variable capacity $24^a$ in parallel and tuned to a frequency 2N (see Fig. $1^a$); or (3) an acceptor circuit, the inductance of which forms a portion of the whole inductance $25^b$ of a parallel resonant circuit both said circuits being tuned by means of variable capacities $24^b$ and $24^{b'}$ to a frequency 2N (see Fig. $1^b$). The coil in the acceptor circuit in the first of these arrangements (or in the parallel resonant circuit in the other arrangements) is coupled to a small aperiodic coil 26, one end of which is connected through a suitable bias battery 27 to ground, and the other end of which is connected to the midpoint of an inductance 28 which is shunted across the control grids 29, 30 of a pair of screen grid valves 31, 32 acting as modulating valves and arranged in push-pull, their cathodes 33, 34 being connected together. As grid 4 of the oscillator is swung positive grid 13 will become positive and grid 12 negative. This action will cause plate 21 to increase in potential and plate 22 to decrease, but by virtue of the detector action of tubes 1 and 2 there will be a net increase in potential of the common lead connecting the two plates, so that a radio frequency voltage is developed between them and ground. As grid 4 is swung negative grid 13 will become negative and grid 12 positive, causing plate 21 to decrease in potential and plate 22 to increase, the net result, due to the detector action again being an increase in potential of the common plate lead. This increase will again cause a voltage to be developed between the plates and ground. It is thus seen that the voltage between plates 21, 22 and ground varies at a frequency twice that of the frequency developed by tube 3 and this voltage causes currents of corresponding frequency to be built up in the acceptor circuit 24—25 which is tuned thereto.

The coil 28 is tuned by a pair of similar and preferably commonly controlled variable condensers 35, 36 in series (the series condensers being of course in shunt across the whole coil) to the frequency of the incoming signal and is coupled to a further coil 37 similarly tuned to a like frequency by a similar arrangement of series variable condensers 38, 39. Incoming signals are led to the terminals of this further coil 37. The anodes 40, 41 of the screen grid modulating valves are connected together through a tuned circuit consisting of an inductance coil 42, whose mid-point is connected through a source of anode potential (not shown) to the common cathode connection, and a pair of fixed condensers 43, 44 in series, said tuned circuit being tuned to a desired resultant beat frequency set up between the incoming signals and the heterodyne frequency. The junction point of the fixed condensers 43, 44 is earthed in the usual manner. The remainder of the receiver includes of course a desired number of beat frequency amplification stages and is well known, and it is not thought necessary to describe it further in the present specification.

It will be seen that with this arrangement the following advantages are obtained:

1. The local oscillator is employed at its fundamental frequency and in consequence a powerful oscillation is not necessary.

2. The incoming tuned circuits are operated on a wave length very different from that of the oscillator so that "pulling" is avoided.

3. There are no balancing i. e. so-called neutrodyne condensers, necessary and in consequence the adjustment of the apparatus is simple.

4. Since the oscillator operates on twice the wave length of the incoming signal, it is possible to receive signals on a very short wave length without heterodyne difficulties.

Figure 2:
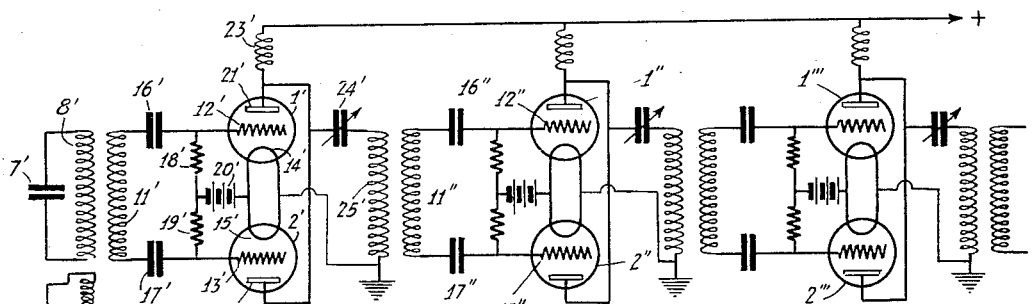
Figure 2A:
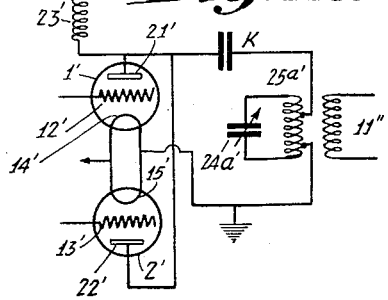
Figure 2B:
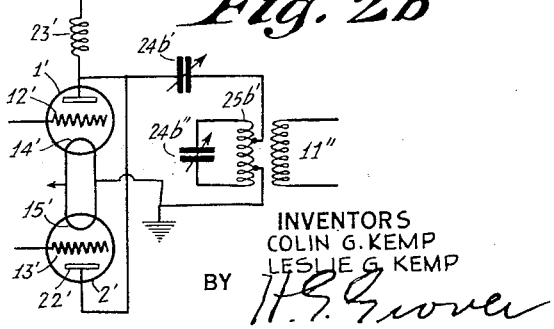

A modification in which the invention is employed as a frequency multiplier suitable for use for multiplying a frequency obtained from a tuning fork generator, crystal controlled oscillator, or other source, is illustrated diagrammatically in the accompanying Fig. 2. Figs. $2^a$ and $2^b$ show detail modifications of the arrangements illustrated in Fig. 2. Referring to Figs. 2 and $2^a$ and $2^b$ and more particularly to Fig. 2, the frequency to be multiplied is applied across the ends of a correspondingly tuned circuit consisting of an inductance 8' shunted by a tuning condenser 7', the inductance being coupled to a further inductance 11' connected through condensers 16', 17' between the grids of a pair of thermionic valves 1', 2' arranged to operate as detectors by means of a bias battery 20' and leak resistances 18', 19' in the same manner as the detectors in the preceding embodiment are arranged, except that in this case the coupling coil 11' in conjunction with the two fixed condensers 16', 17' form a series resonant circuit tuned to the frequency of the preceding circuit 8', 7' to which it is coupled. The anodes 21', 22' of the detector valves are connected together and the common point is connected through a choke 23' to a source of anode potential and to ground either through (1) an acceptor circuit 24', 25' tuned to twice the incoming frequency (see Fig. 2); or (2) a suitable blocking condenser K and the portion of the inductance of a parallel resonant circuit composed of an inductance $25^{a'}$ and a variable capacity $24^{a'}$ in parallel and tuned to twice the incoming frequency (see Fig. $2^a$); or (3) an acceptor circuit the inductance of which forms a portion of the whole inductance $25^{b'}$ of a parallel resonant circuit both said circuits being tuned by means of variable capacities $24^{b'}$ and $24^{b''}$ to twice the incoming frequency.

The coil in the acceptor circuit in the first case or the parallel resonant circuit in the second and third case is coupled to a further coil 11'' which is connected through fixed condensers 16'', 17'' between the grids 12'', 13'' of a pair of further thermionic detectors 1'', 2'' which detectors are connected in the same way as the preceding pair except that the anode resonant circuit, or circuits, is, or are, in this case tuned to four times the original incoming frequency. Further pairs of detector frequency multipliers 1''', 2''' are similarly arranged in cascade, each pair serving to double the frequency fed thereto until the final frequency is the required multiple of the original input frequency.

While we have indicated and described several systems for carrying our invention into effect, it will be apparent to one skilled in the art that our invention is by no means limited to the particular organizations shown and described, but that many modifications may be made without departing from the scope of our invention as set forth in the appended claims.

Having now particularly described and ascertained the nature of our said invention and in what manner the same is to be performed we declare that what we claim is:

1. A superheterodyne receiver comprising in combination a source of signal energy, a local oscillator comprising an electron discharge tube having a tunable input circuit and an output circuit coupled to its input circuit to provide a feedback path, means for tuning the input circuit of said oscillator tube to a frequency relatively widely different from the frequency of a desired signal, a frequency multiplier circuit connected in the output circuit of said oscillator tube, said multiplier including at least two tubes having their grid circuits connected in said feed-back path, a frequency changer including a pair of tubes arranged in push pull, the common input circuit of said last mentioned tubes including means for tuning it to a desired signal frequency, and means in the common output circuit of said push-pull connected tubes for resonating it to a desired beat frequency, said signal source and common tunable input circuit of said last mentioned push pull tubes being coupled, and means for coupling the common output circuit of said multiplier tubes and the common input circuit of said frequency changer tubes.

2. A superheterodyne receiver comprising in combination a source of signal energy, a local oscillator comprising an electron discharge tube having a tunable input circuit and an output circuit coupled to its input circuit to provide a feed-back path, means for tuning the input circuit of said oscillator tube to a frequency relatively widely different from the frequency of a desired signal, a frequency multiplier circuit connected in the output circuit of said oscillator tube, said multiplier including at least two tubes having their grid circuits connected in said feed-back path, a frequency changer including a pair of screen grid tubes arranged in push pull, the common input circuit of said last mentioned tubes including means for tuning it to a desired signal frequency, and means in the common output circuit of said push-pull connected tubes for resonating it to a desired beat frequency, said signal source and common tunable input circuit of said last mentioned push-pull tubes being coupled, and means for coupling the common output circuit of said multiplier tubes and the common input circuit of said frequency changer tubes.

3. A superheterodyne receiver comprising in combination a source of signal energy, a local oscillator comprising an electron discharge tube having a tunable input circuit and an output circuit coupled to its input circuit to provide a feed-back path, means for tuning the input circuit of said oscillator tube to a frequency relatively widely different from the frequency of a desired signal, a frequency multiplier circuit connected in the output circuit of said oscillator tube, said multiplier including at least two tubes having their grid circuits connected in said feed-back path, a frequency changer including a pair of tubes arranged in push pull, the common input circuit of said last mentioned tubes including means for tuning it to a desired signal frequency, means in the common output circuit of said push-pull connected tubes for resonating it to a desired beat frequency, said signal source and common tunable input circuit of said last mentioned push pull tubes being coupled, means for coupling the common output circuit of said multiplier tubes and the common input circuit of said frequency changer tubes, and means in the common output circuit of said frequency multiplier tubes for resonating the output circuit to at least twice the frequency of the energy impressed upon the common input circuit of said multiplier tubes.

4. A superheterodyne receiver comprising in combination a source of signal energy, a local oscillator comprising an electron discharge tube having a tunable input circuit and an output circuit coupled to its input circuit to provide a feed-back path, means for tuning the input circuit of said oscillator tube to a frequency relatively widely different from the frequency of a desired signal, a frequency multiplier circuit connected in the output circuit of said oscillator tube, said multiplier including at least two tubes having their grid circuits connected in said feed-back path, a frequency changer including a pair of tubes arranged in push pull, the common input circuit of said last mentioned tubes including means for tuning it to a desired signal frequency, means in the common output circuit of said push-pull connected tubes for resonating it to a desired beat frequency, said signal source and common tunable input circuit of said last mentioned push pull tubes being coupled, and means for coupling the common output circuit of said multiplier tubes and the common input circuit of said frequency changer tubes, and means in the common input circuit of said frequency multiplier tubes to operate the tubes including leak resistances and bias means associated with the grids of said multiplier tubes.

5. A superheterodyne receiver comprising a source of signal energy including means for selecting a desired signal frequency, a frequency changer circuit comprising a pair of electron discharge tubes connected in push pull and having its common input circuit coupled to said selecting means for the transfer to the common input circuit of the frequency changer of energy of said desired frequency, means for tuning the common input circuit of said frequency changer tubes to said desired frequency, means in the common output circuit of said frequency changer tubes for resonating the said output circuit to a desired beat frequency, a source of local oscillations adapted to produce energy of a frequency differing from said desired signal frequency by said beat frequency comprising an oscillator tube having its input circuit tunable to a frequency equal to at least one half of said local oscillation frequency, and having its output circuit retroactively coupled to its tunable input circuit, and means in the output circuit of said oscillator tube for multiplying the aforementioned frequency of the input circuit of said oscillator tube to said local oscillation frequency, and means for coupling the output circuit of said oscillator tube to the tunable input circuit of said frequency changer tubes.

6. An oscillator system, adapted for use with a superheterodyne receiver which includes a source of signal energy, a frequency changer having an input circuit tuned to a desired signal frequency and an output circuit resonated to a desired beat frequency, said system comprising an electron discharge tube having a tunable input circuit and an output circuit coupled to its input circuit to provide a feed-back path, means for tuning the input circuit of said tube to a frequency relatively widely different from the said desired signal frequency, a frequency multiplier circuit connected in the output circuit of said tube, said multiplier including at least two tubes having their grid circuits connected in said feed-back path, and means for coupling the common output circuit of said multiplier tubes to the input circuit of said frequency changer.

7. An oscillator system adapted for use with a superhetrodyne receiver which includes a source of signal energy, a frequency changer having an input circuit tuned to a desired signal frequency and an output circuit tuned to a desired beat frequency, said system comprising an electron discharge tube having an input circuit and a plate circuit coupled to its input circuit to provide a feedback path, means for tuning the input circuit to a frequency N which is widely different from the desired signal frequency, a pair of vacuum tubes connected in push-pull relation and having their input circuits coupled to the input circuit of said discharge tube, and their plate circuits connected in parallel, a series resonant circuit connected between the plates and cathodes of said tubes tuned to a frequency 2N, and coupling means connecting said series resonant circuit to the input circuit of said frequency changer.

8. The combination of the preceding claim in which said coupling means comprises a secondary coil having its high potential end connected to the electrical center of the input circuit of the frequency changer.

COLIN GORDON KEMP.
LESLIE GEORGE KEMP.